(12) United States Patent
Krauss (10) Patent No.: US 8,806,462 B2
(45) Date of Patent: Aug. 12, 2014

(54) IDENTIFYING CODE THAT WASTES TIME SWITCHING TASKS

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 13/316,508

(22) Filed: Dec. 11, 2011

(65) Prior Publication Data

US 2012/0084763 A1   Apr. 5, 2012

Related U.S. Application Data

(63) Continuation of application No. 11/163,265, filed on Oct. 12, 2005, now Pat. No. 8,095,921.

(51) Int. Cl.
*G06F 9/45* (2006.01)
*G06F 9/44* (2006.01)

(52) U.S. Cl.
USPC .......... 717/151; 717/108; 717/116; 717/131; 717/140

(58) Field of Classification Search
CPC ............. G06F 8/24; G06F 8/41; G06F 8/443; G06F 9/4433
See application file for complete search history.

(56) References Cited

U.S. PATENT DOCUMENTS

| 6,081,665 | A | * | 6/2000 | Nilsen et al. | 717/116 |
|---|---|---|---|---|---|
| 6,101,524 | A | | 8/2000 | Choi et al. | |
| 6,105,051 | A | | 8/2000 | Borkenhagen et al. | |
| 6,167,424 | A | | 12/2000 | Bak et al. | |
| 6,256,775 | B1 | | 7/2001 | Flynn | |
| 6,530,079 | B1 | * | 3/2003 | Choi et al. | 717/158 |
| 6,691,304 | B1 | | 2/2004 | Zhang et al. | |
| 6,799,236 | B1 | | 9/2004 | Dice et al. | |
| 7,093,262 | B2 | | 8/2006 | Ma et al. | |
| 7,200,846 | B2 | | 4/2007 | Dice et al. | |
| 7,308,680 | B2 | * | 12/2007 | Grover et al. | 717/114 |
| 7,661,098 | B2 | * | 2/2010 | Sheikh et al. | 717/151 |
| 7,747,985 | B2 | | 6/2010 | Campbell et al. | |
| 7,788,650 | B2 | * | 8/2010 | Johnson et al. | 717/140 |
| 8,510,722 | B2 | * | 8/2013 | Yang et al. | 717/131 |
| 8,645,917 | B2 | * | 2/2014 | Arnold et al. | 717/118 |
| 2004/0025160 | A1 | | 2/2004 | Dice et al. | |
| 2004/0025164 | A1 | | 2/2004 | Ma et al. | |
| 2004/0123185 | A1 | | 6/2004 | Pierce et al. | |
| 2004/0250240 | A1 | * | 12/2004 | Stoodley et al. | 717/116 |
| 2005/0071831 | A1 | * | 3/2005 | Sheikh et al. | 717/151 |
| 2005/0080813 | A1 | * | 4/2005 | Shi et al. | 707/103 R |
| 2005/0198045 | A1 | | 9/2005 | Wu et al. | |

(Continued)

OTHER PUBLICATIONS

Martinez et al., Speculative synchronization: applying thread-level speculation to explicitly parallel applications, Dec. 2012, 12 pages.*

(Continued)

*Primary Examiner* — Thuy Dao
(74) *Attorney, Agent, or Firm* — Cuenot, Forsythe & Kim, LLC (57) ABSTRACT

A method of detecting portions of code of a computer program that protect resources of a computer system unnecessarily can include identifying threads and synchronization objects that are used by a computer program during execution, determining the number of threads that have accessed each resource while it has been consistently protected by a particular synchronization object, and indicating whether the resource is suited for protection according to the number of threads that have accessed the resource.

20 Claims, 5 Drawing Sheets

(56) References Cited

U.S. PATENT DOCUMENTS

| | | |
|---|---|---|
| 2006/0015858 A1 | 1/2006 | Tanimoto et al. |
| 2007/0174829 A1* | 7/2007 | Brockmeyer et al. ......... 717/151 |
| 2011/0283256 A1* | 11/2011 | Raundahl Gregersen et al. ............................ 717/108 |

OTHER PUBLICATIONS

Kulkarni et al., Memory centric thread synchronization on platform FPGAs, Mar. 2006, 6 pages.*

Bacon, et al., "Thin locks: featherweight Synchronization for Java," Apr. 2004, pp. 583-595, <http://delivery.acm.org/10.1145/990000/989452/p583-bacon.pdf>.

Choi, et al., "Stack allocation and synchronization optimizations for Java using escape analysis," 2003, pp. 876-909, <http://delivery.acm.org/10.1145/950000/945892/p876-choi.pdf>.

Begic, "An Introduction to Runtime Analysis with Rational PurifyPlus," The Rational Edge, Dec. 2002, pp. 1-18 (accessed Apr. 6, 2010) <http://www.ibm.com/developerworks/rational/library/content/03July/2000/2315/2315_GB.pdf>.

* cited by examiner

IDENTIFYING CODE THAT WASTES TIME SWITCHING TASKS

CROSS-REFERENCE TO RELATED APPLICATIONS

This application is a Continuation of U.S. application No. 11/163,265, filed on Oct. 12, 2005.

BACKGROUND

1. Field of the Invention

The present invention relates to software development and, more particularly, to identifying portions of code of a computer program that may cause needless switching between tasks.

2. Description of the Related Art

Many programming languages, operating systems, and other software development environments support what are known as "threads" of execution. Threads are similar to processes, in that each represents a single sequence of computer program instructions that can be executed in parallel with other sequences of instructions. Threads are executed in parallel within a computer system using technologies such as time slicing and preemption. In essence, threads provide a mechanism by which a computer program can split itself into two or more simultaneously running tasks.

Because threads are capable of operating in parallel, there may be a scenario in which more than one thread tries to access to a given computer resource, such as a portion of memory, at the same time. In the typical case, a thread requires constantly unshared access to a portion of memory during the time while a particular set of instructions is executing. That is, the thread reads and writes to a given portion of memory. During that time, if another thread writes to the same portion of memory, the data may become inaccurate, "clobbered", or otherwise corrupted.

To avoid such a condition, synchronization objects, also referred to as "locks", usually are employed. Examples of synchronization objects can include, but are not limited to, defining a portion of code as a "critical section" which requires the use of a particular application programming interface (API), semaphores, or the like, for accessing the resource. In general, once a synchronization object is engaged by a thread A, the synchronization object prevents threads B and C, for example, from also engaging the synchronization object. This causes threads B and C, which must engage the synchronization object, to block or wait until the synchronization object is removed or disengaged by thread A.

Task switching refers to the situation in which a computer system executes one thread, and prior to completing execution of that thread, switches contexts to begin executing a different thread. Task switching can occur under several different circumstances. For example, one situation in which task switching can occur is when a thread runs of out time. A time slicing computer system allots a predetermined amount of time to executing each thread. When that time period expires, the computer system switches to begin executing another task. While task switching does allow parallel execution of multiple threads, overly frequent task switching can cause execution of thread management tasks to consume a large percentage of CPU time. This can substantially degrade performance of a computer program.

Another situation in which a computer system switches tasks is attributable to what can be referred to as a "blocking condition". A blocking condition occurs when a thread needs access to a resource that is protected by a synchronization object engaged by another thread. So long as that resource is thus protected, the blocked thread is not given the opportunity to run. A blocking condition can result in failure of threads to perform actual work. This too can substantially degrade effective performance of a computer system.

It would be beneficial to provide a solution which can detect portions of software code that cause potentially unnecessary task switching within a computer system.

SUMMARY OF THE INVENTION

The present invention provides a method and apparatus for detecting portions of code of a computer program that may cause unnecessary task switching. One embodiment of the present invention can include a method of detecting portions of code of a computer program that protect resources of a computer system unnecessarily. The method can include identifying a synchronization object that has been engaged by a thread of the computer program and, while the synchronization object is engaged, recording each access of a resource of the computer system that is protected by the synchronization object and a thread associated with the access. When the synchronization object is disengaged, a number of threads which accessed the resource protected by the synchronization object during execution of the computer program can be determined. The method also can include indicating whether the resource protected by the synchronization object is suited for protection according to the number of threads that accessed the resource while the synchronization object was engaged during execution of the computer program.

A method of detecting portions of code of a multithreaded computer program that can cause unnecessary task switching within a computer system can include identifying resources protected by synchronization objects during execution of the multithreaded computer program and counting instances, during execution of the multithreaded computer program, in which a resource that is protected by a synchronization object is accessed by only a single thread that engaged the synchronization object. The method further can include indicating that resources accessed by only the single thread that engaged the synchronization object during execution of the multithreaded program are unsuitable for protection by a synchronization object.

Another embodiment of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention provides a solution for detecting portions of code that may cause unnecessary task switching within a computer system. The inventive arrangements disclosed herein provide a runtime analysis tool for evaluating a program under test. During execution of the program under test, information relating to the use of synchronization objects by various threads can be collected. The synchronization object usage information can be analyzed to identify candidate portions of computer program code which, according to analysis criteria, have apparently caused unnecessary task switching during an execution of the program under test. Since needless task switching within a computer system can waste significant time, bringing such portions of code to the attention of a software developer can aid in optimizing and improving computer program performance.

The various functions described herein can be implemented within a software analysis tool. In one embodiment, for example, the various functions described herein can be implemented as extensions of one or more members of the Rational PurifyPlus family of software analysis tools which are commercially available from International Business Machines Corporation of Armonk, N.Y. (IBM). PurifyPlus is a family of computer programs that provide runtime analysis functionality to software developers and testers. In general, runtime analysis refers to the practice of understanding application behavior using data collected during execution of a program under test.

The present invention further can include functionality for generating call graphs via runtime analysis. A tool called Quantify, for example, which is a member of the PurifyPlus product family, can produce call graphs for a program under test. In general, a call graph refers to a diagram that identifies the functions, methods, and/or modules in a system or computer program and shows which functions, methods, and/or modules invoke one another. A call graph also can be referred to as a call tree or a tier chart.

The various development activities that can be analyzed using PurifyPlus can include, but are not limited to, memory corruption detection and memory profiling in native C/C++ applications, memory profiling in Java and .NET managed code applications, performance profiling to identify slow or inefficient portions of code, code coverage analysis, and runtime tracing. PurifyPlus also can perform thread profiling. Thread profiling entails inspecting and preventing intermittent hangs, data corruption, or performance degradation due to deadlocks, race conditions, and/or thread starvation.

The various products disclosed herein are intended to provide a basis for teaching one skilled in the art to better understand the inventive arrangements disclosed herein. It should be appreciated, however, that the present invention can be implemented as a standalone application, as part of a larger application or in virtually any appropriately detailed structure, computer program, and/or portion thereof.

Figure 1:
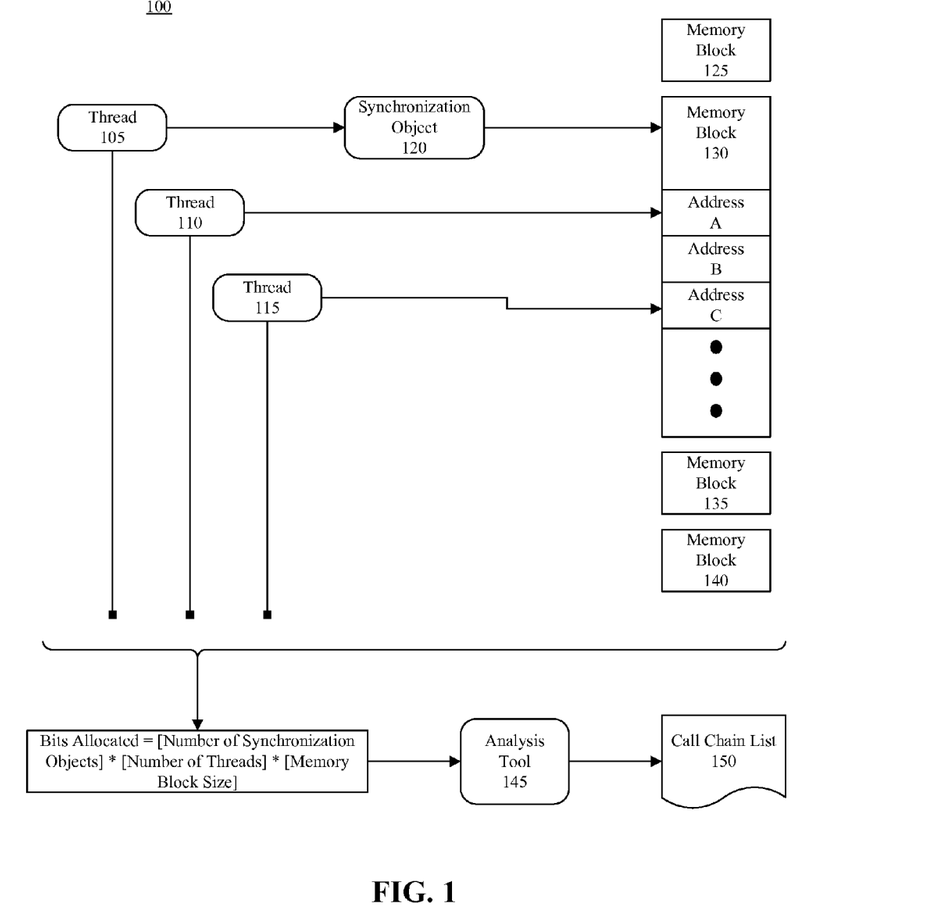
FIG. 1 is a schematic diagram illustrating a system capable of detecting portions of code that can cause unnecessary task switching within a computer system in accordance with one embodiment of the present invention.

FIG. 1 is a schematic diagram illustrating a system 100 for detecting portions of code that can cause unnecessary task switching within a computer system in accordance with one embodiment of the present invention. FIG. 1 represents the execution of a computer program, i.e. a program under test, which includes threads 105, 110, and 115. During execution of the program under test, threads 105-115 can access memory blocks 125, 130, 135, and 140. Access to memory blocks 125-140 can be gained through various functions such as "malloc" in the C programming language, or via other heap allocation mechanisms, and can be accessed through memory read and write operations such as register load and store instructions.

As shown, thread 105 has engaged synchronization object 120 to protect memory block 130. Analysis tool 145, such as one of the variety already described herein, can evaluate the execution of the program under test, and note which threads have accessed which memory blocks and/or addresses within the memory blocks. Further, the analysis tool 145 can determine the time at which each portion of memory, or address, is accessed by each thread as well as whether a synchronization mechanism was engaged at that time. If such a synchronization mechanism was engaged, information such as the resource(s) that the synchronization object was protecting also can be recorded.

In order to track the different accesses of the memory blocks 125-140 by threads 105-115, the analysis tool 145 can allocate a particular portion of memory referred to as state memory. The size of the state memory can be dictated by one or more parameters. In one embodiment, for example, the number of bits allocated for tracking purposes can be calculated as follows: Bits Allocated=(Number of synchronization objects)*(Number of threads)*(Memory block size). As memory block addresses are accessed by threads, bits in the state memory can be allocated and set accordingly.

It should be appreciated, however, that other tracking and memory allocation mechanisms can be used for tracking thread activity, synchronization object usage, resources protected by synchronization objects, and the timing of such activities. Accordingly, the present invention is not intended to be limited to the use of one particular technique or data structure. For example, lists and any other suitable data structures also can be used.

The state memory can be evaluated according to established criteria to identify portion(s) of code that were considered likely to cause unnecessary task switching during the portion of the analysis that was performed while synchronization objects were engaged. Based upon this evaluation, call chains leading to the identified portions of code that have accessed blocks with needless protection can be identified. While such call chains can be indicated or otherwise brought to the attention of a software developer, in one embodiment, the number of identified needlessly protected accesses of a block can be compared with a predetermined threshold number. If the number of identified accesses meets or exceeds the predetermined threshold number, then any identified call chains associated with the resource can be indicated in some manner and/or included in a call chain list 150.

With reference to FIG. 1, for example, the state memory can indicate that thread 105 has engaged synchronization object 120 to protect memory block 130. During the time that synchronization object 120 was engaged by thread 105, thread 110 and thread 115 waited for synchronization object 120, though neither of threads 110 and 115 ever accessed memory block 130 during that time within the run of the program under test. Alternatively, in a more rigorous embodiment in which each individual memory address is associated with its own state bit tracking, the state memory further can indicate the addresses that are accessed by threads. For example, the state memory can indicate that thread 110 attempted to access address A of memory block 130 and that thread 115 attempted to access address C of memory block 130 during the time that synchronization object 120 protected memory block 130 on behalf of thread 105, which has not accessed either address A or C thus far during the run. These are the situations in which the memory block, or individual memory addresses, may be tagged as unsuitable for protection by a synchronization object 120.

It should be appreciated that FIG. 1 is presented for purposes of illustration only and that the present invention is not intended to be restricted by the number of threads or memory blocks shown. That is, the computer program under test, i.e. the program that is executed and evaluated using a software tool configured in accordance with the inventive arrangements disclosed herein, can include fewer or more threads and/or memory blocks as the case may be. Further, although memory blocks have been shown to illustrate particular aspects of the present invention, it should be appreciated that the inventive arrangements disclosed herein can be applied to other resources which can be protected and/or regulated through the use of synchronization, including individual memory addresses, peripheral devices, and any other resource that may require synchronized access. Accordingly, the present invention is not intended to be limited solely to the observation of memory block access.

Figure 2:
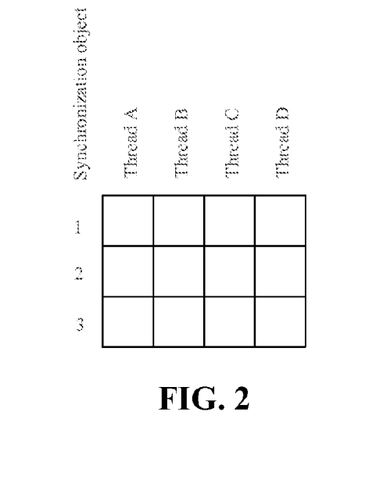
FIG. 2 is a pictorial illustration of state memory in accordance with one embodiment of the present invention.

FIG. 2 is a pictorial diagram illustrating state memory in accordance with one embodiment of the present invention. FIG. 2 illustrates a simple state bit management scheme. In this illustration, the state memory can include a table having 12 state bits allocated per resource, or memory block. Such a configuration assumes that three synchronization objects and four threads exist at block allocation time. It should be appreciated, however, that more or fewer synchronization objects and/or threads can be in existence and that the numbers indicated herein are presented for purposes of illustration only.

In any case, the state bits represent information on a per synchronization object and on a per thread basis. A "0" entry in the table can indicate that a block has not been accessed by the indicated thread while the indicated synchronization object was engaged. A "1" entry in the table can indicate that the block has been accessed by the indicated thread while the indicated synchronization object was engaged. Because blocks may continue to be accessed while additional threads and synchronization objects are created, the state bit table associated with each block may be enlarged via reallocation to accommodate additional state bit requirements when a block is accessed.

FIGS. 3-9 are a series of flow charts illustrating various aspects of detecting portions of code that can cause unnecessary task switching within a computer system in accordance with the inventive arrangements disclosed herein. As noted, the various methods disclosed herein can be implemented using a runtime analysis tool as previously described. Further, the methods can begin in a state where the runtime analysis tool has been started and is monitoring a program under test, which also is executing.

Figure 3:
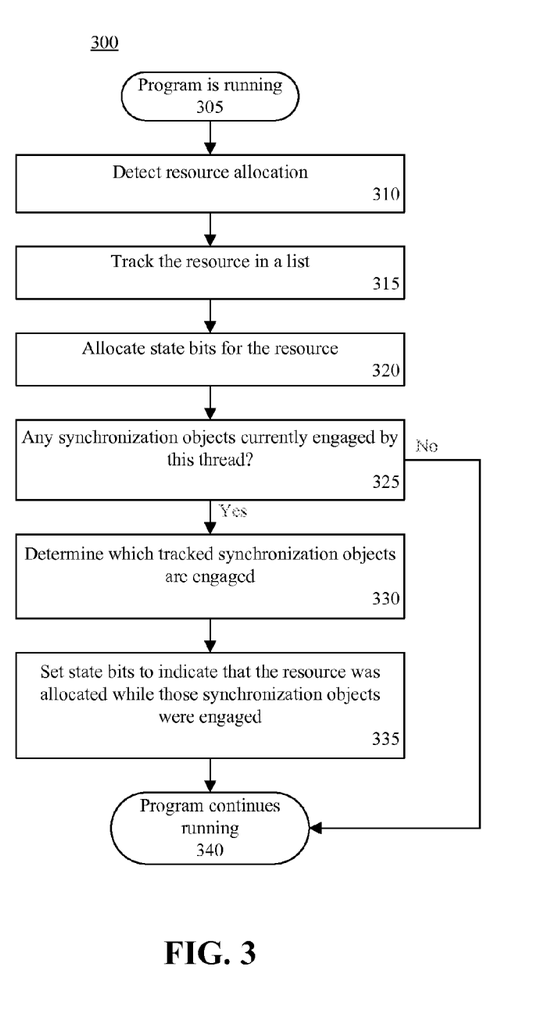
FIG. 3 is a flow chart illustrating one aspect of detecting portions of code that can cause unnecessary task switching within a computer system in accordance with the inventive arrangements disclosed herein.

FIG. 3 is a flow chart illustrating one aspect of detecting portions of code that can cause unnecessary task switching within a computer system in accordance with the inventive arrangements disclosed herein. Method 300 illustrates one technique for tracking resource allocation and synchronization object usage. Accordingly, in step 305, the analysis tool can be executing along with the program under test. In step 310, the runtime analysis tool can detect a resource allocation within the program under test. As noted, while a resource can include a memory block, a resource further can include peripheral devices or other quantities in which access to the quantity within the computer system is regulated in some fashion.

In step 315, the resource that was allocated can be tracked by the runtime analysis tool. In one embodiment, the resource can be tracked via a list. In another embodiment, this list can be implemented as a skiplist. Each element in this list can serve as an anchor for, or root of, a call chain, a state bit table, as well as a set of counters. Thus, when memory is allocated, a skiplist entry can be created for the resource. Each skiplist entry can serve as an anchor for a call chain that can be collected if the resource is later determined to be unsuitably protected by one or more synchronization objects. Each skiplist entry also may anchor a state bit table that may be updated as the resource is accessed.

A set of count fields containing one "unsuitability" counter per synchronization object also can be tracked in the skiplist entry for a memory block. In general, when the memory block is accessed by a thread that has caused another thread to block, and if synchronization objects are apparently unsuitably engaged, each unsuitability count is incremented. If a synchronization object is later determined to be "definitely suitable" for the memory block, the relevant counters are set to a special value such as "−1" to indicate this condition or finding.

In step 320, state bits can be allocated for the resource. The number, or amount, of state bits/memory allocated can be determined according to the number of tracked threads and the number of tracked synchronization objects as discussed with reference to FIG. 2. In step 325, a determination can be made as to whether any synchronization objects are currently engaged by the currently executing thread. If not, the method can proceed to step 340 to continue monitoring the program under test. If synchronization objects are engaged by this thread, the method can proceed to step 330.

In step 330, the runtime analysis tool can determine which tracked synchronization objects are engaged. In step 335, the appropriate state bits can be set to indicate that the resource was allocated while the identified synchronization objects were engaged. The method then can proceed to step 340 to continue processing as described herein.

Figure 4:
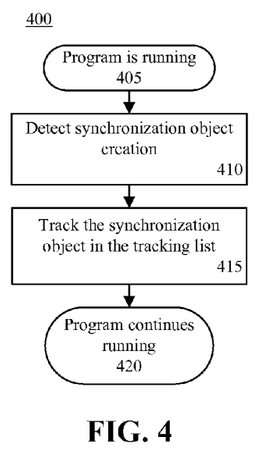
FIG. 4 is a flow chart illustrating another aspect of detecting portions of code that can cause unnecessary task switching within a computer system in accordance with the inventive arrangements disclosed herein.

FIG. 4 is a flow chart illustrating another aspect of detecting portions of code that can cause unnecessary task switching within a computer system in accordance with the inventive arrangements disclosed herein. Method 400 illustrates one way in which the creation of synchronization object(s) can be detected. In step 405, the runtime analysis tool and the program under test can be executing.

In step 410, the runtime analysis tool can detect the creation of a synchronization object. Synchronization objects can be tracked on a "synchronization object list". In one embodiment, this list can be implemented as a skiplist. Interception of synchronization application programming interfaces (APIs) such as the InitializeCriticalSection( ), EnterCriticalSection( ), and LeaveCriticalSection( ) APIs available on computer systems running a Microsoft® Windows® variety of operating system can be used to indicate the fact that a synchronization object exists, that a thread is attempting to engage that synchronization object, and that a thread is attempting to disengage the synchronization object, respectively. At any given time, the list of entries can indicate whether the synchronization object is engaged as well as which thread, if any, has engaged the synchronization object at that time. In step 415, the runtime analysis tool can track the synchronization object in the tracking list and continue to step 420 to continue execution.

Figure 5:
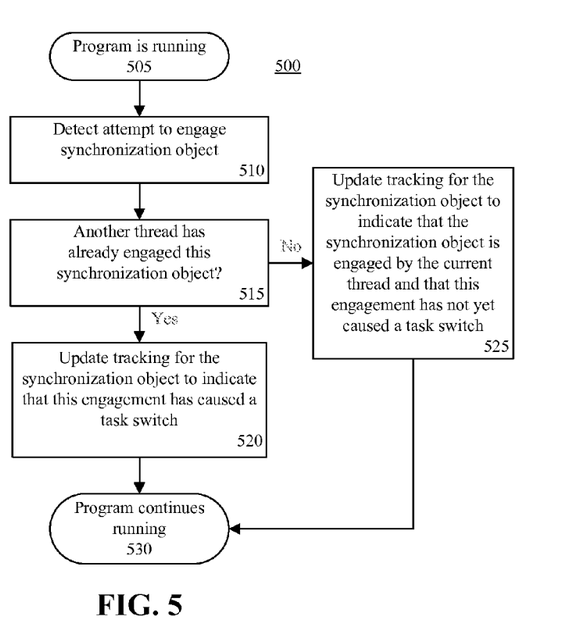
FIG. 5 is a flow chart illustrating another aspect of detecting portions of code that can cause unnecessary task switching within a computer system in accordance with the inventive arrangements disclosed herein.

FIG. 5 is a flow chart illustrating another aspect of detecting portions of code that can cause unnecessary task switching within a computer system in accordance with the inventive arrangements disclosed herein. Method 500 illustrates one manner in which synchronization object usage can be monitored. In step 505, the runtime analysis tool and the program under test can be executing. In step 510, the runtime analysis tool can detect an attempt to engage a synchronization object.

An access, or attempted access as the case may be, can include, but is not limited to, a blocking condition. In general, "blocking" refers to a condition in which one thread is unable to execute because it must wait for access to a resource such as a synchronization object engaged by another thread. Blocking may result in unnecessary task switching as a thread that has been given processor time may be unable to perform actual work because the thread must wait for a protected resource to become available. A blocking condition can be detected by analyzing the calls to the API to attempt to engage the synchronization object that occur on other threads while the synchronization object is engaged. That is, if more than one thread has attempted to engage the synchronization object at once, a blocking condition has occurred.

In step 515, a determination can be made as to whether another thread has already engaged this synchronization object. If so, the method can proceed to step 520. If not, the method can continue to step 525. In step 525, the tracking information for the synchronization object can be updated to indicate that the synchronization object is engaged by the current thread. Further, the tracking information can be updated to indicate that the engagement of the synchronization object by the current thread has not yet caused a task switch. The method then can proceed to step 530 to continue processing as may be required.

In step 525, in the case where the runtime analysis tool determined that another thread had already engaged the synchronization object, the tracking information for the synchronization object also is updated. In this case, however, the tracking information for the synchronization object can be updated to indicate that this engagement of the synchronization object did cause a task switch. In other words, another thread has stopped to wait for the synchronization object. After step 525, the method can continue to step 530 to continue processing.

Figure 6:
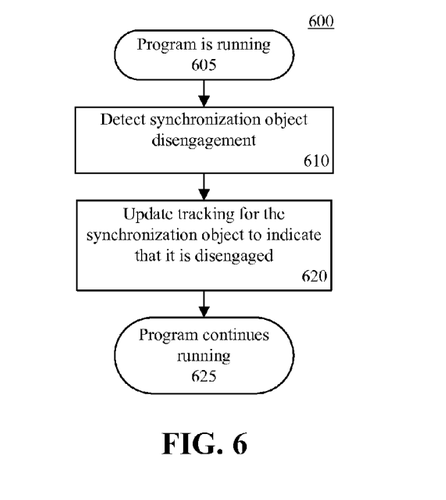
FIG. 6 is a flow chart illustrating another aspect of detecting portions of code that can cause unnecessary task switching within a computer system in accordance with the inventive arrangements disclosed herein.

FIG. 6 is a flow chart illustrating another aspect of detecting portions of code that can cause unnecessary task switching within a computer system in accordance with the inventive arrangements disclosed herein. Method 600 illustrates one manner of monitoring for the release of synchronization objects by the program under test. In step 605, the runtime analysis tool and the program under test can be executing. In step 610, the runtime analysis tool can detect a disengagement, or release, of a synchronization object. In step 620, the tracking information for the synchronization object can be updated to indicate that the synchronization object has been released. The method can continue to step 625 to continue processing.

Figure 7:
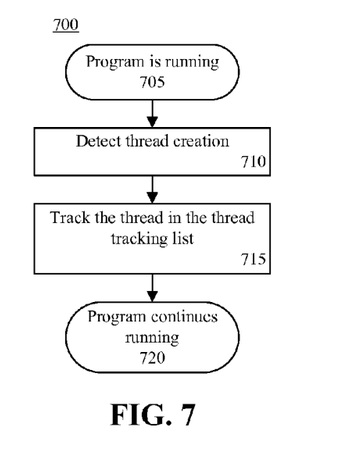
FIG. 7 is a flow chart illustrating another aspect of detecting portions of code that can cause unnecessary task switching within a computer system in accordance with the inventive arrangements disclosed herein.

FIG. 7 is a flow chart illustrating another aspect of detecting portions of code that can cause unnecessary task switching within a computer system in accordance with the inventive arrangements disclosed herein. Method 700 illustrates one technique for monitoring thread creation. In step 705, the runtime analysis tool and the program under test can be executing.

In step 710, the runtime analysis tool can detect the creation of a thread. In one embodiment, threads can be tracked on a "thread list". This list also can be implemented as a skiplist to facilitate fast access. Thread creation can be intercepted via hooks of one form or another on most computer systems. On computer systems running a Microsoft® Windows® variety of operating system, the interception can occur via a DllMain( ) routine that is invoked with a dwReason parameter indicating a "thread attach" status. This routine can query the identifier (ID) of a thread and add the thread to the thread list. In step 715, the thread's existence and ID can be tracked in the thread tracking list. The runtime analysis tool and the program under test can continue processing in step 720.

A convention can be established to associate threads and synchronization objects tracked in the different tracking lists noted herein and the bits in the state memory table associated with each block. The bits in the table can remain set over time. As different threads, holding different synchronization objects, access the block, more bits in the table likely will be set. The bits then can be used to determine whether a synchronization object that is currently engaged was also engaged during a previous access of that block by a different thread.

Figure 8:
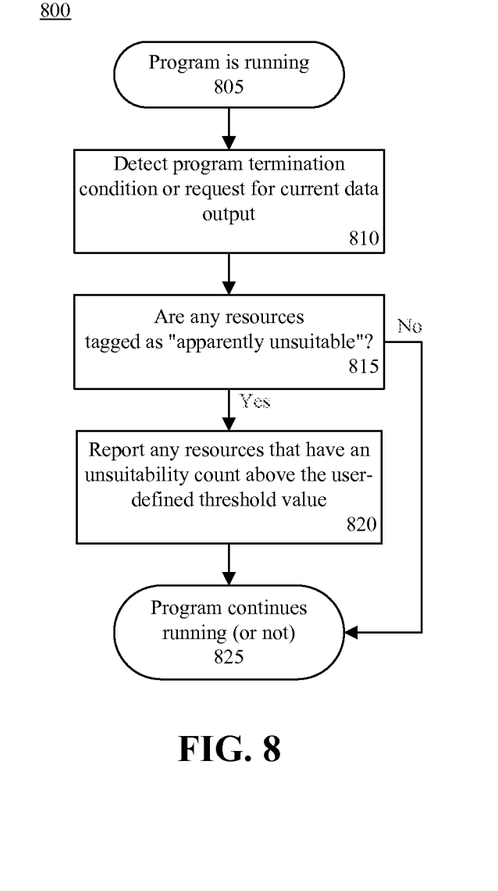
FIG. 8 is a flow chart illustrating another aspect of detecting portions of code that can cause unnecessary task switching within a computer system in accordance with the inventive arrangements disclosed herein.

FIG. 8 is a flow chart illustrating another aspect of detecting portions of code that can cause unnecessary task switching within a computer system in accordance with the inventive arrangements disclosed herein. More particularly, method 800 describes particular circumstances in which the runtime analysis tool can discontinue execution. In step 805, the runtime analysis tool and the program under test can be executing. In step 810, a program termination condition or a request for current data output can be detected. A program termination condition can include, but is not limited to, a fault detected in the program under test, a user instruction for the runtime analysis tool to end, etc.

In step 815, a determination can be made as to whether any resources have been tagged as being "apparently unsuitable". If so, the method can proceed to step 825. If a program termination condition was detected, the runtime analysis tool can discontinue execution. If, in step 810, a request for current data output was received, the runtime analysis tool can continue execution in step 825. In step 820, in the case where resources have been tagged as being "apparently unsuitable", the runtime analysis tool can report any resources that have an unsuitability count that is above a defined threshold value. This threshold value can be a user adjusted value which can be adjusted based upon the requirements or design goals of the particular program under test.

Figure 9:
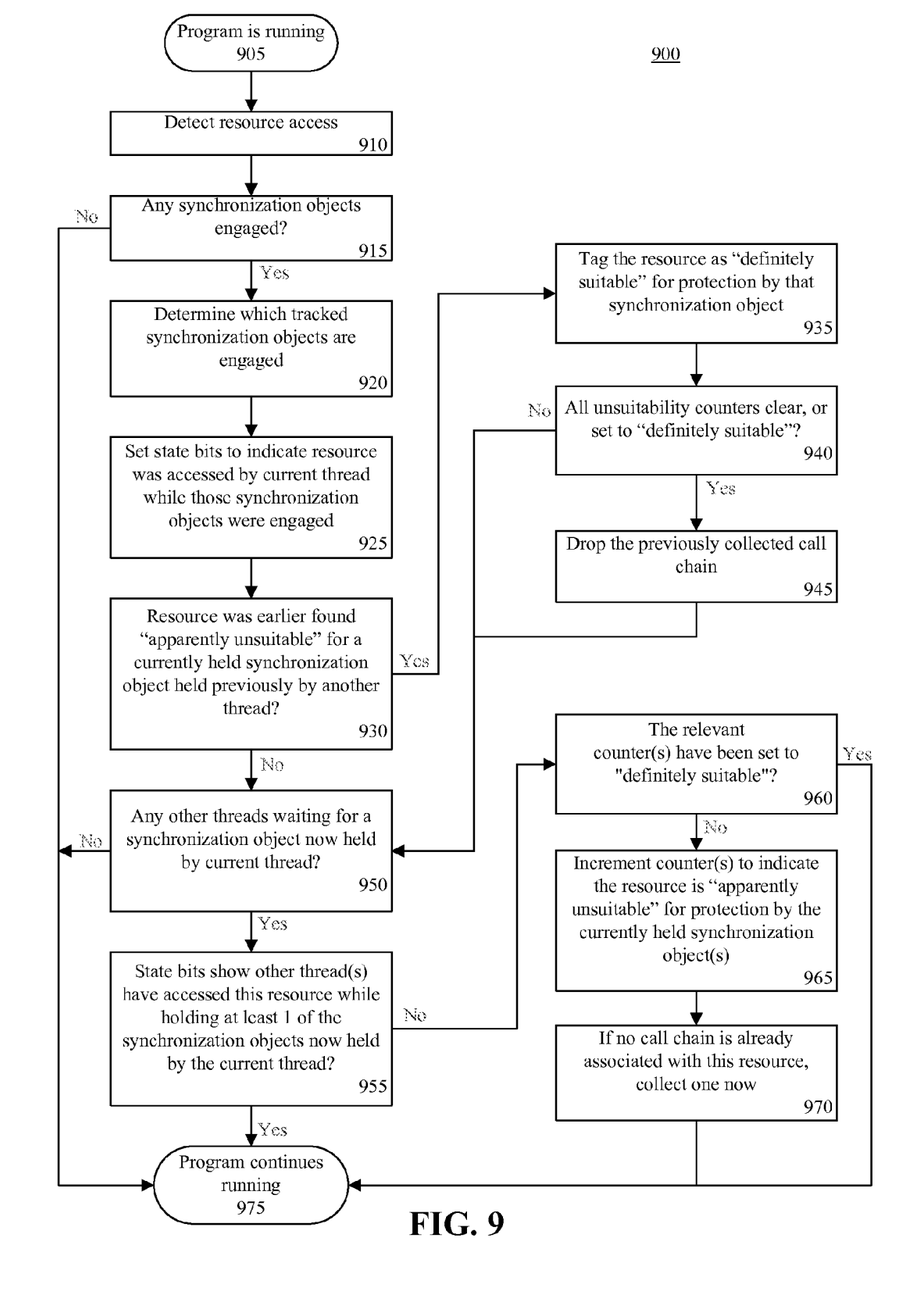
FIG. 9 is a flow chart illustrating another aspect of detecting portions of code that can cause unnecessary task switching within a computer system in accordance with the inventive arrangements disclosed herein.

FIG. 9 is a flow chart illustrating another aspect of detecting portions of code that can cause unnecessary task switching within a computer system in accordance with the inventive arrangements disclosed herein. Method 900 illustrates one manner of tagging resources as being suitable or unsuitable for protection by synchronization objects. Accordingly, in step 905, the runtime analysis tool and the program under test can be executing.

In step 910, an access to a resource can be detected. In step 915, a determination can be made as to whether any synchronization objects have been engaged. If so, the method can proceed to step 920. If not, the method can continue to step 975 to continue execution. In step 920, the runtime analysis tool can determine which tracked synchronization objects are engaged by querying the synchronization object tracking list.

In step 925, the runtime analysis tool can set selected state bits to indicate that a resource was accessed by the currently executing thread while the synchronization objects identified in step 915 were engaged. In step 930, a determination can be made by the runtime analysis tool as to whether the resource accessed in step 910 was earlier found to be "apparently unsuitable" for a currently held synchronization object held previously by another thread. If so, the method can proceed to step 935. If not, the method can continue to step 950.

In step 935, the runtime analysis tool can tag the resource accessed in step 910 as "definitely suitable" for protection by the synchronization object. In step 940, a determination can be made as to whether all of the unsuitability counters are clear or have been set to "definitely suitable". If not, the method can proceed to step 950. If so, however, the method can continue to step 945, where the previously collected call chain is dropped or deleted. After step 945, the method can proceed to step 950.

In step 950, the runtime analysis tool can determine whether any other threads within the program under test are waiting for a synchronization object that is now held by the current thread. If so, the method can proceed to step 955. If not, the method can continue to step 975 to continue processing. In step 955, a determination can be made as to whether the state bits for the resource being accessed show that other thread(s) have accessed this resource while holding at least one of the synchronization objects now held by the currently executing thread. If so, the method can proceed to step 975. If not, the method can continue to step 960, where a determination can be made as to whether the relevant counter(s) have been set to "definitely suitable". If so, the method can proceed to step 975. If not, the method can continue to step 965.

In step 965, the counter(s) can be incremented to indicate that the resource is "apparently unsuitable" for protection by the currently held synchronization object(s). In step 970, if no call chain is already associated with this resource, the appropriate call chain can be collected and/or identified at this point. After step 970, the method can proceed to step 975.

It should be appreciated that the methods described herein have been provided for purposes of illustration only and are not intended to limit the present invention in any way. Further, it should be appreciated that the methods described herein can be implemented in serial and/or parallel fashion as may be required to track resource usage when a plurality of different synchronization objects are engaged.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of detecting portions of code of a computer program that protect resources of a computer system, comprising:
   identifying a synchronization object engaged by a thread of the computer program;
   recording, while the synchronization object is engaged,
      each access of a resource, of the computer system, that is protected by the synchronization object and
      a thread associated with the access;
   determining, upon the synchronization object being disengaged, a number of threads that have accessed the resource while the resource was protected by the synchronization object during execution of the computer program; and
   indicating, according to the number of threads, whether the resource is suited for protection.

2. The method of claim 1, wherein said recording includes:
   for each resource that is accessed, determining whether state memory has been allocated for the resource; and
   upon not, allocating state memory for recording accesses to the resource.

3. The method of claim 2, wherein said allocating includes apportioning a number of state bits determined according to a number of synchronization objects that have been engaged in the computer program, a number of threads running in the computer program, and a measure of size of the resource.

4. The method of claim 3, wherein said recording includes:
for each access of the resource, setting at least one bit corresponding to a thread responsible for the access and the synchronization object engaged during the access.

5. The method of claim 1, wherein said indicating includes upon more than one thread has accessed the resource during an execution of the program under test while the synchronization object was engaged, noting that the resource is suitable for protection by that synchronization object.

6. The method of claim 1, wherein said indicating includes upon a single thread accessed the resource while the synchronization object was engaged, noting that the resource is unsuitable for protection.

7. The method of claim 1, further comprising
storing a call chain leading to a first access of the resource protected by the synchronization object.

8. The method of claim 7, wherein said indicating includes:
counting a number of instances in which the resource is deemed apparently unsuitable for protection; and
upon the number of instances exceeds a predetermined threshold, indicating the call chain.

9. A method of detecting portions of code of a multi-threaded computer program that cause task switching within a computer system, comprising:
identifying resources protected by synchronization objects during execution of the multithreaded computer program;
counting instances during execution of the multithreaded computer program in which a resource that is protected by a synchronization object is accessed by only a single thread that engaged the synchronization object; and
indicating that resources accessed by only the single thread that engaged the synchronization object during execution of the multithreaded program are unsuitable for protection by a synchronization object.

10. The method of claim 9, further comprising:
for each resource that is accessed while a synchronization object is engaged for the resource, determining whether state memory has been allocated; and
upon not, allocating state memory for recording accesses to the resource.

11. The method of claim 10, wherein said allocating includes
apportioning a number of state bits determined according to a number of synchronization objects that have been engaged in the multithreaded computer program, a number of threads running in the multithreaded computer program, and a measure of size of the resource.

12. The method of claim 11, wherein said identifying includes
for each access of a memory block, setting at least one bit corresponding to the thread responsible for the access and the synchronization object engaged during the access.

13. The method of claim 9, further comprising
storing a call chain leading to a first access of the resource protected by the synchronization object.

14. The method of claim 13, wherein said indicating includes
upon the number of instances exceeds a predetermined threshold, indicating the call chain.

15. A computer program product comprising computer usable memory having stored therein computer usable program code for detecting portions of code of a computer program that protect resources of a computer system, the computer usable program code which when executed by a computer hardware device, causes the computer hardware device to perform:
identifying resources protected by synchronization objects during execution of the multithreaded computer program;
counting instances during execution of the multithreaded computer program in which a resource that is protected by a synchronization object is accessed by only a single thread that engaged the synchronization object; and
indicating that resources accessed by only the single thread that engaged the synchronization object during execution of the multithreaded program are unsuitable for protection by a synchronization object.

16. The computer program product of claim 15, wherein the computer usable program code further causes the computer hardware device to perform:
for each resource that is accessed while a synchronization object is engaged for the resource, determining whether state memory has been allocated; and
upon not, allocating state memory for recording accesses to the resource.

17. The computer program product of claim 16, wherein said allocating includes
apportioning a number of state bits determined according to a number of synchronization objects that have been engaged in the multithreaded computer program, a number of threads running in the multithreaded computer program, and a measure of size of the resource.

18. The computer program product of claim 17, wherein said identifying includes
for each access of a memory block, setting at least one bit corresponding to the thread responsible for the access and the synchronization object engaged during the access.

19. The computer program product of claim 15, wherein the computer usable program code further causes the computer hardware device to perform
storing a call chain leading to a first access of the resource protected by the synchronization object.

20. The computer program product of claim 15, wherein said indicating includes
upon the number of instances exceeds a predetermined threshold, indicating the call chain.

* * * * *